June 21, 1932.                R. BODEMULLER                1,864,402
                          AUTOMATIC LIQUID LEVEL REGULATOR
                                Filed July 18, 1930
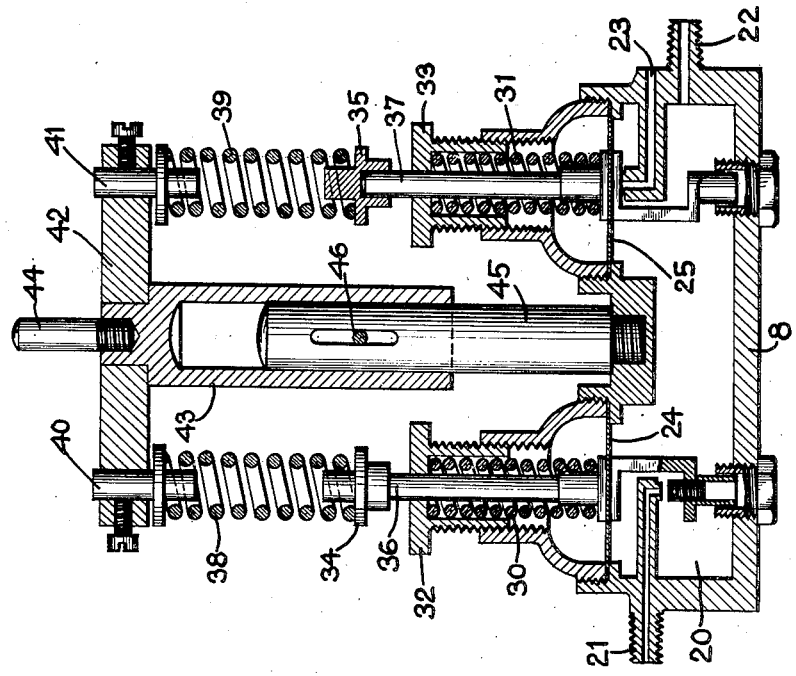
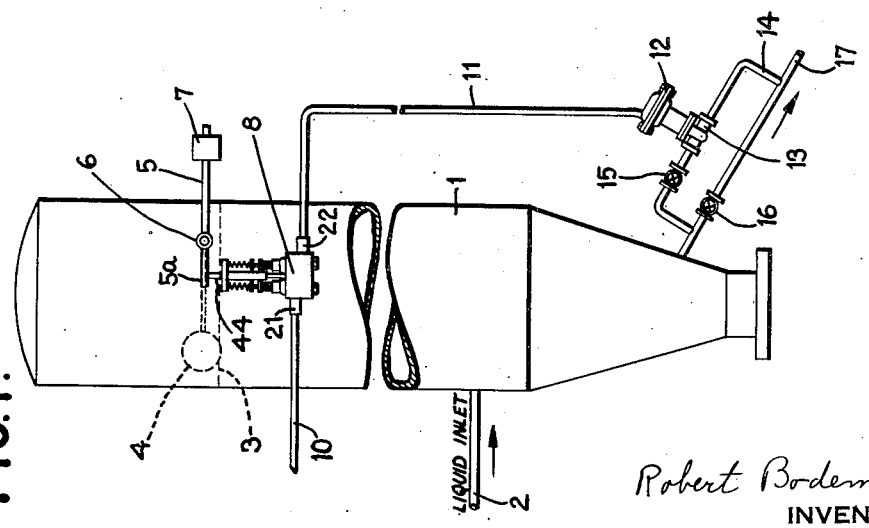
Robert Bodemuller
INVENTOR
BY ATTORNEY
R J Dearborn Patented June 21, 1932

1,864,402

UNITED STATES PATENT OFFICE

ROBERT BODEMULLER, OF NEDERLAND, TEXAS, ASSIGNOR TO THE TEXAS COMPANY, OF NEW YORK, N. Y., A CORPORATION OF DELAWARE

AUTOMATIC LIQUID-LEVEL REGULATOR

Application filed July 18, 1930. Serial No. 468,817.

This invention relates to improvements in systems for regulating the volume of a body of liquid maintained in a vessel to which more liquid is added and from which liquid is regulatably removed, and it relates more specifically to that portion or mechanism of the system consisting of a regulating element which is influenced by the level of the liquid in the vessel to regulate the pressure upon a piston or diaphragm to thereby regulate the degree of opening or closing of one or more valves or other restricting means through which liquid removed from the vessel is passed.

The present invention contemplates maintaining a body of liquid in a vessel at a substantially constant level as more liquid is added thereto by automatically removing such quantities of liquid as are added to the body in excess of the amount desirably maintained. It is to be understood, however, that the invention in its broadest aspect is not limited merely to maintaining a desirable quantity of liquid in a vessel by regulating the removal of a portion of it as more liquid is added. It may be applied to maintain a substantially constant body of liquid in a vessel by regulating the addition of more liquid as portions of it are removed or in a slightly modified form it may be applied to maintain a desirable pressure within a container. Other uses and advantages of my invention will become apparent from the following description and the accompanying drawing, which describes and illustrates a preferred embodiment of my invention, in the latter of which:

Figure 1 is a diagrammatic view in elevation of a system, including my invention, adapted to maintain a desirable body of liquid in a vessel by regulatably removing portions of it as more liquid is added.

Figure 2 is a view in sectional elevation of the regulating element indicated in Figure 1.

In Figure 1 of the drawing, 1 is a vessel having a liquid supply pipe 2, from a source not shown, in which it is desirable to maintain a body of liquid whose level should normally be at the point 3. A float 4 resting upon the surface of the liquid is counterbalanced by an outside counterweight 7, both being mounted on a lever assembly or rigid double crank 5 which is rockably supported by a pivoting means 6. A horizontal projection 5a of one arm of the crank 5 is provided whose function will be fully described presently.

Working in conjunction with the float arrangement and supported suitably to the outer wall of the vessel 1, is a regulating element 8 which has a compressed air supply line 10, from a source not shown, and an air pressure transmission line 11 leading from the regulator 8 to the upper side of a diaphragm 12. When acted upon by the pressure in the regulator 8, transmitted through the line 11, the diaphragm 12 serves to regulate a balanced valve 13 which is situated in a pipe 14 through which excess quantities of liquid are withdrawn from the vessel 1.

A valve 15, which is capable of being manipulated by hand, is also situated in the line 14. A draw-off line 17 having a valve 16 is provided for draining the vessel of all liquid.

Referring now to Figure 2, which illustrates in detail the regulator 8, a chamber 20 is provided with a valved air or gas inlet 21 to which the line 10 is connected, an outlet 22 to which the line 11 is connected and a valved release port 23. Diaphragms 24 and 25 cooperate with and serve as mountings for the valves operating in conjunction with the inlet 21 and the release port 23 respectively. Coil springs 30 and 31 having cap nuts 32 and 33, respectively, for retaining and adjusting the tension of these springs, rest upon the diaphragms 24 and 25. Elements 34 and 35 resting upon pins 36 and 37, which serve as guides for the springs 30 and 31, serve as seats for cushioning springs 38 and 39, the upper portions of the latter springs being secured by retaining elements 40 and 41. The elements 40 and 41 are rigidly attached to a bar 42 which is mounted on a slidable or depressible member 43 having a vertically projecting pin 44. The slidable member 43 encases and slides upon a vertical shaft 45 which is slotted to receive a pin 46, attached to the slidable member 43, which limits the sliding movement of this member.

It is to be understood that the balanced valve 13, regulated by the diaphragm 12, is so adjusted as to remain in open position when not acted upon by air or gas pressure admitted to the upper side of the diaphragm 12. The regulator 8, however, is preferably situated relative to the liquid level so that a slight pressure is held against the diaphragm 12 which serves to appropriately restrict the opening in the valve 13. Thus the valve may be further restricted or opened more fully as the occasion requires.

When going into operation, air or gas under pressure from supply line 10 passes through valved inlet 21 into the chamber or reservoir 20. Coil spring 30 and 31 are each so adjusted, by nuts 32 and 33, that the tension on diaphragms 24 and 25, respectively, is balanced. The tension on these diaphragms is precisely sufficient so that the valved inlet 21 remains open and the valved release 23 remains closed until a given air or gas pressure, for example 15 pounds, has been built up within the reservoir 20, at which time the valve in the inlet 21 will close. Should the pressure exceed 15 pounds the valve in the release 23 will open long enough to release the excess air.

Thus it is to be seen that normally the pressure of the air acting upon the diaphragm 12 through line 11, connected with outlet 22, will be constant, that is about 15 pounds. This is to partially close the valve 13, as previously mentioned, to thereby regulate the rate of withdrawal of liquid through the pipe 14 according to the rate of addition of fresh liquid to that in the vessel.

Assume now that the body of liquid in the vessel 1 increases slightly and the level rises above the point 3. The rising float 4 and the previously mentioned projection 5a of the lever 5 will be lifted a proportional distance from the plunger 44 and the pressure against the diaphragms 24 and 25, caused normally by the adjusted springs 30 and 31 and the somewhat compressed springs 38 and 39, will be reduced according to the amount the compression of springs 38 and 39 is relieved. Due to the relief in the compression of the springs 38 and 39, with consequent relief of tension upon the diaphragms 24 and 25, the valved inlet 21 will remain closed and the release valve 23 will open to discharge enough air to relieve the overbalance of the air in the chamber and the springs 31 and 39 will then function to close the valve. The pressure drop in the chamber 20 resulting from the release of air therefrom also results in a reduction of pressure against the diaphragm 12 and thereby causes the valve 13 to open wider so as to remove excess liquid from the vessel 1 more rapidly to thus bring the level back to normal.

It follows that the lowering level of the body of liquid in the vessel 1 will bring about a reverse action of the valves in the chamber 20 and that eventually the pressure in the chamber 20 will be returned to the normal 15 pounds and the resultant partial closing of the valve 13 will again restrict the flow of liquid to its previous normalcy.

On the other hand, assuming that the liquid level drops below the point 3, then the weight of the float 4 and the lever 5, depressing the plunger 44, will accordingly increase the tension on the springs 38 and 39, which act upon diaphragms 24 and 25 respectively, so that the release valve 23 will remain closed and inlet 21 will open, admitting such air as is necessary to increase the pressure within the chamber 20 to thereby reduce the opening in the valve 13 to restrict the flow of liquid out of the vessel and cause the level to build back up to normal.

It is obvious that many minor changes may be made in the form of the apparatus without departing from the material principles thereof. It is not therefore desired to confine the invention to the exact form herein shown and described but it is wished to include all such forms as come within the scope claimed.

What I claim is:

1. A pressure regulator comprising a chamber having a compressed air inlet valve, an air outlet to means controlled by pneumatic pressure, a release valve for releasing air from the chamber, resilient mountings for the air inlet and release valves, springs cooperating with and altering the tension on the mountings, means for adjusting the degree of tension the springs cause on the mountings, cushioning springs cooperating indirectly with the resilient mountings, means connected with the cushioning springs dependent upon movements of separate actuating mechanism to indirectly increase and decrease tension on the mountings to effect the opening and closing of the air inlet and release valves to thereby regulate the pressure within the chamber and on the pressure controlled means.

2. A pressure regulator comprising a chamber having a compressed air inlet valve, an air outlet to means controlled by pneumatic pressure, a release valve for releasing air from the chamber, resilient mountings for the air inlet and release valves, springs cooperating with and altering the tension on the mountings, means for adjusting the degree of tension the springs cause on the mountings, cushioning springs cooperating indirectly with the resilient mountings, reciprocable slidable means connected with the cushioning springs dependent upon movements of separate actuating mechanism to indirectly increase and decrease tension on the mountings to effect the opening and closing of the air inlet and release valves.

3. In a system where a body of liquid of desirable volume is maintained, including a vessel having a means of liquid supply and a discharge pipe having a pressure regulating diaphragm valve, apparatus for regulating pressure upon the diaphragm valve according to the volume of liquid in the vessel to thereby regulate the degree of opening of the valve which comprises a chamber having a compressed air inlet valve, an air outlet pipe from the chamber connecting with the diaphragm valve, a release valve for releasing air from the chamber, resilient mountings for the air inlet and release valves, springs cooperating with and altering the tension on the mountings, means for adjusting the degree of tension the springs cause on the mountings, mechanism actuated by changes in the level of liquid in the vessel which cooperates indirectly with the mountings to operate the air inlet and air release valves to thereby regulate the opening of the diaphragm valve by regulating the pressure within the chamber and on the valve diaphragm.

4. In combination with a vessel in which a desired volume of liquid is maintained, having a liquid inlet and a liquid outlet, float mechanism capable of being raised and lowered by any rise and fall of the liquid, a diaphragm valve in the liquid outlet whose operation is controlled by pneumatic pressure, a pressure regulator for regulating the degree of opening of said valve comprising, a chamber having a compressed air inlet valve, an air outlet to the diaphragm valve, a release valve for releasing air from the chamber, resilient mountings for the air inlet and release valves, springs cooperating with and altering the tension on the mountings, means for adjusting the degree of tension the springs cause on the mountings, cushioning springs cooperating indirectly with the resilient mountings, means connected with the cushioning springs dependent upon movements of the float mechanism to indirectly increase and decrease tension on the mountings to effect the opening and closing of the air inlet and release valves to thereby regulate the pressure within the chamber and on the diaphragm valve.

5. In combination with a vessel in which a desired volume of liquid is maintained, having a liquid inlet and a liquid outlet, float mechanism capable of being raised and lowered by any rise and fall of the liquid, a diaphragm valve in the liquid outlet whose operation is controlled by pneumatic pressure, a pressure regulator for regulating the degree of opening of said valve comprising, a chamber having a compressed air inlet valve, an air outlet to the diaphragm valve, a release valve for releasing air from the chamber, resilient mountings for the air inlet and release valves, springs cooperating with and altering the tension on the mountings, means for adjusting the degree of tension the springs cause on the mountings, cushioning springs cooperating indirectly with the resilient mountings, reciprocable slidable means connected with the cushioning springs dependent upon movements of the float mechanism to indirectly increase and decrease tension on the mountings to effect the opening and closing of the air inlet and release valves.

In witness whereof I have hereunto set my hand this 7th day of July, 1930.

ROBERT BODEMULLER.